May 25, 1926.
F. F. NEWHOUSE
SPECTACLES
Filed August 23, 1923　　2 Sheets-Sheet 2
1,586,110
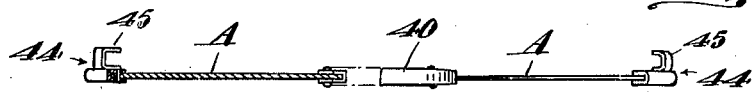
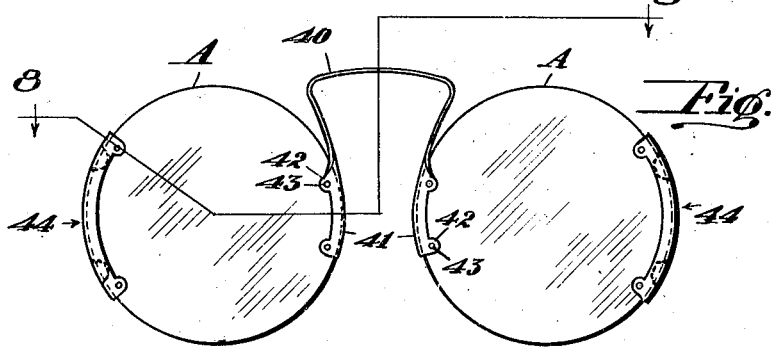
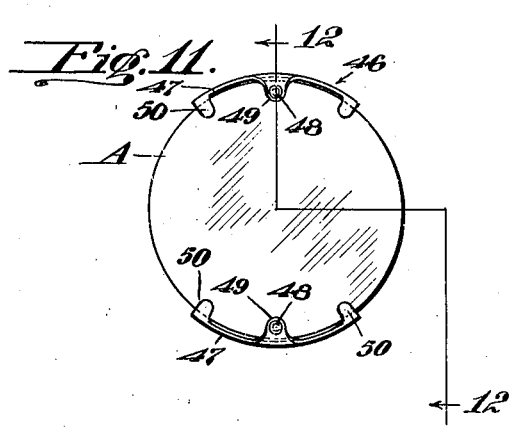
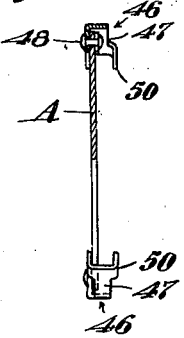
Inventor
Frank F. Newhouse
By R. S. Berry
Attorney Patented May 25, 1926.

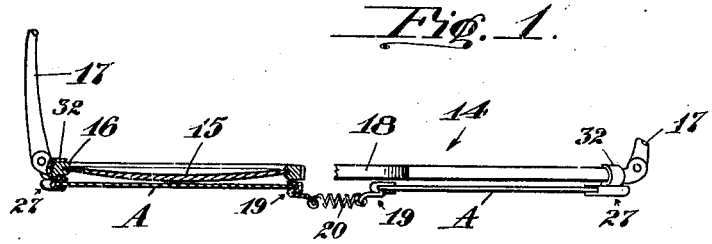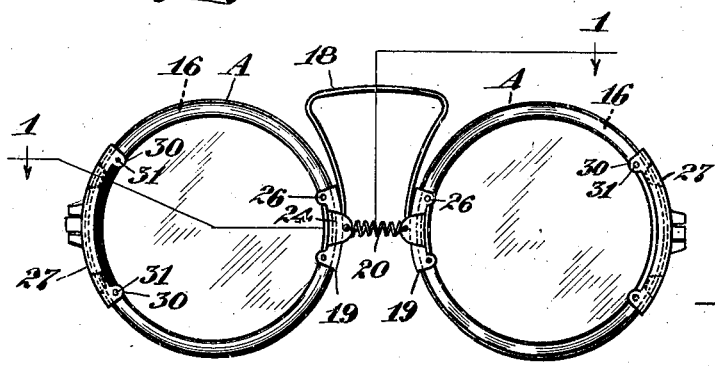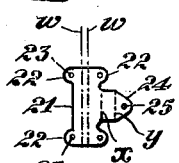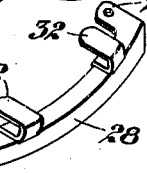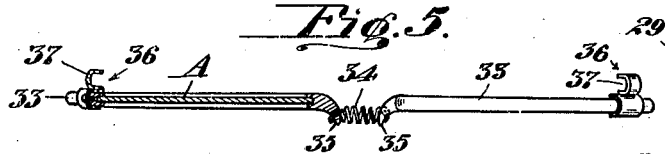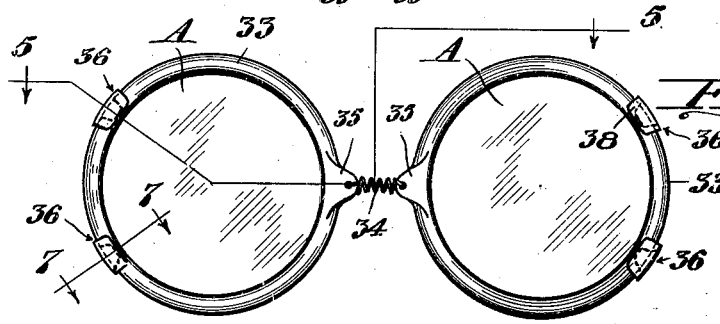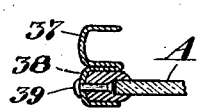

1,586,110

UNITED STATES PATENT OFFICE.

FRANK F. NEWHOUSE, OF GLENDALE, CALIFORNIA.

SPECTACLES.

Application filed August 23, 1923. Serial No. 658,855.

This invention particularly pertains to spectacles of the type employed to protect the eyes from a glare of light.

An object of this invention is to provide a set of non-glare lenses which are adapted to be detachably mounted on the ordinary spectacles such as are used to correct or improve defective vision.

Another object of my invention is to provide spectacles forming an adjunct to eyeglasses, whereby the wearer is spared the inconvenience of wearing two similarly constructed aids to vision at the sacrifice oftentimes of one or the other in the interest of comfort.

Another object of my invention is to insure to the wearer of eyeglasses his comfortably worn normal vision aids, together with the added protection afforded by spectacles for protecting the eyes from a glare of light.

With the foregoing objects in view together with such other objects and advantages as may subsequently appear, my invention resides in the construction, combination and arrangement of parts hereinafter described and claimed, and illustrated by way of example in the accompanying drawings, in which—

Figure 1 is a plan view in partial section as seen on the line 1—1 of Figure 2.

Figure 2 is an elevational view illustrating the application of the invention.

Figure 3 is a detail and plan view illustrating the blank for forming one of the bridge plates shown in Figures 1 and 2.

Figure 4 is a perspective view of one of the attachment clamps.

Figure 5 is a plan view and partial section as seen on the line 5—5 of Figure 6.

Figure 6 is a view in elevation illustrating a modified form of the invention.

Figure 7 is a detail in cross section as seen on the line 7—7 of Figure 6.

Figure 8 is a plan view and partial section as seen on the line 8—8 of Figure 9.

Figure 9 is a view in elevation showing another modified form of the invention.

Figure 10 is a plan view of a further modification of the invention.

Figure 11 is a view in elevation of the device shown in Figure 10.

Figure 12 is a view in section and elevation as seen on the line 12—12 of Figure 11.

Referring to the drawings more specifically, 14 indicates a conventional form of eyeglasses having a pair of lenses 15 mounted in rims 16 carrying bows 17 connected in the usual manner; the rims 16 being united by a spring bridge 18.

In carrying out my invention I employ a pair of lenses indicated at A throughout the several views of the drawings, which lenses are made of celluloid, glass or other transparent or semi-transparent material, colored or otherwise processed to form a non-glare medium adapted to protect the eyes against light rays.

The lenses A are designed to be carried on the eyeglasses 14 and are preferably adapted to be detachably mounted thereon.

In the form of the invention shown in Figures 1 and 2 of the drawings, the lenses A are without rims and are joined by a bridge member comprising plates 19 mounted on the lenses A and connected together by a coil spring 20. Each plate 19 is formed of a sheet metal blank, illustrated in Figure 3, which blank comprises a body portion 21, having on each end oppositely extending semi-circular rivet lugs 22 formed with rivet holes 23. A projection 24 is formed on one side of the blank intermediate the end lugs 22, which projection terminates in a semi-rounded end having an opening 25 therein. In forming the bridge plate 19 from the blank, the body portion 21 of the latter is bent longitudinally upon itself along the lines indicated at $w$—$w$ to give the plate a U-shaped cross section so that it may be set astride the lenses A; the blank being curved longitudinally to fit the periphery of the lenses. The extension 24 is bent upon the line $x$ to lie parallel to and adjoining the body portion 21 of the semi-rounded end and is again bent on the line $y$ to extend away from the body portion 21, thereby forming a bracket to which the spring bridge is adapted to be connected by engaging the ends of the spring 20 with the openings 25 in the projections or brackets 24. The plates 19 are secured to the lenses by means of rivets 26 which pass through the openings 23 in the lugs 22 and through corresponding holes in the lenses.

Mounted on the lenses A diametrically opposite the plates 19 are attachment clamps 27, as particularly shown in Figure 4, the shape and form of which is similar to the bridge plates 19, but of greater length. The attachment clamps comprise a U-shaped body portion 28, adapted to set astride the edge of the lenses, which body portion is curved to conform to the curved margin of the lens. Rivet lugs 29 are provided on each end of the body portion 28 and are formed with rivet holes 30 to receive rivets 31 which pass through corresponding openings in the lenses, by which construction the attachment clamps are secured to the lenses. Hook members 32 are formed on the body member 28 and extend at right angles to the body member, which hook members are adapted to engage the eyeglasses, being set astride the rims 16 of the eyeglasses, as shown in Figure 1, or engaged with the peripheries of the lenses where the eyeglasses are rimless. The hook members 32 on the clamp members 28 are held in engagement with the lenses by the pull exerted by the spring 20; the latter being placed under tension when the attachment clamps are engaged with the eyeglasses. The bridge plates 19 are so mounted on the lenses A as to bring the spring 20 in front of the plane of the lenses so as not to conflict in position with the bridge 18 of the eyeglasses, or the position of the nose of the wearer, as shown in Figure 1 of the drawings, and the hook members 32 of the attachment clamps project from the back of the lenses A.

It is obvious that in adapting the spectacles having the lenses A to a pair of eyeglasses 14, the attachment clamps 28 are normally spaced apart a distance less than the longitudinal distance between the side edges of the eyeglasses so that when the hook members are engaged with the eyeglasses the coil spring bridge 20 will be placed under sufficient tension to maintain the spectacles in their proper position upon the eyeglasses.

In the form of the invention illustrated in Figures 5, 6 and 7, the lenses A are mounted in rims 33 connected together by a coil spring bridge 34, which spring is engaged at its ends with openings in brackets 35 carried on the rims, and mounted on the rims on the side opposite the brackets 35 are attachment clamps 36 which embody hook members 37 which project from the side of the rims opposite the brackets 35 and are formed on U-shaped rim-embracing members 38 which are secured to the rims by rivets 39 or other suitable fastenings. A pair of the spaced hook members 37 is provided on each rim 33 and is adapted to be engaged with the peripheries of the lenses of the eyeglasses under the action of the spring 34 in the manner described relative to the form of the invention shown in Figures 1 and 2.

In the form of the invention shown in Figures 8 and 9 the lenses A, either with or without rims, are united by a substantially U-shaped spring clamp 40, which is preferably formed integral with plates 41 of U-shaped cross section, having apertured lugs 42 adapted to extend astride the lenses A and to be secured to the latter by rivets 43.

The bridge members 40 and 41 are conformed to the desired conventional pince-nez type of eyeglass mounting, which adapts this form of my invention to be employed as spectacles, either with or without eyeglasses; the lenses A being provided with clamping members 44 substantially corresponding to the clamping members 27 described in reference to Figures 1 and 2; that is to say, embodying hook members 45 adapted to be engaged with a pair of eyeglasses and to be maintained in engagement therewith by the tension exerted by the spring bridge member 40.

In the form of the invention illustrated in Figures 10, 11 and 12, the lenses A are adapted to be mounted to extend over the lenses in the eyeglasses and held in engagement therewith independent of each other; that is to say, a separate lens A is provided for each lens of the eyeglasses. As a means for effecting engagement between the single lens A and the lens of an eyeglass, a pair of attachment clamps 46 is provided on the lens A each of which attachment clamps comprises a curved plate spring member 47 adapted to extend parallel to the periphery of the lens A and is secured thereto by rivets 48 passing through lugs 49 projecting from the edges of the plate springs intermediate their ends astride of the lens A. Spring arms are thus formed on opposite sides of the lugs 49 which terminate in hook members 50 which are adapted to extend astride the periphery of an eyeglass lens or lens frame and to be held in engagement therewith by the tension of the plate springs 47; the plate springs on the opposite sides of the lens A being placed under tension when engaged with the eyeglass lens or frame, and opposing each other to effect a clamping action.

It will be seen from the foregoing that I have provided a non-glare spectacle attachment for eyeglasses which may be readily applied to and removed from a pair of eyeglasses for which they are fitted; the hook members on the attachment clamps in each of the forms of the invention here shown being adapted to be readily engaged with the lens or frames of a pair of eyeglasses and to be held in engagement therewith by opposing tensional pressure exerted inwardly on the edges of the eyeglasses in the direction of the plane thereof.

I claim—

In a device of the character described, in combination with a pair of spectacles having lenses for correcting or improving defective vision, of a pair of supplemental lenses, a spring, a plate on each of said supplemental lenses to which the ends of said spring are attached whereby said supplemental lenses are yieldably connected together, a pair of spaced hooked members on each of said supplemental lenses arranged diametrically opposite said plates and adapted to engage the outer end portions of the spectacles; the hook members on the respective supplemental lenses being normally spaced apart a distance less than the length of the span between the end portions of the spectacles whereby on engaging the hook members with the spectacles said spring will be placed under tension and thereby exert an inward pull on said supplemental lenses to yieldably maintain said hook members in engagement with the spectacles.

FRANK F. NEWHOUSE.